United States Patent Office 3,816,630
Patented June 11, 1974

3,816,630
TREATMENT OF SWINE DYSENTERY
Raymond Alexander Bowie and Arthur William James Broome, Macclesfield, England, assignors to Imperial Chemical Industries Limited, London, England
No Drawing. Filed Dec. 26, 1972, Ser. No. 318,657
Claims priority, application Great Britain, Feb. 8, 1972, 5,796/72
Int. Cl. A61k 27/00
U.S. Cl. 424—250
4 Claims

ABSTRACT OF THE DISCLOSURE

The disclosure relates to a method of treating or preventing swine dysentery by administration of quinoxaline 1,4-dioxide.

---

This invention relates to a veterinary method for the prophylaxis or treatment of the condition in pigs known as swine dysentery.

Swine dysentery is a widespread and commercially important disease, the precise aetiology of which is unknown, although a large spirochete, *Treponema hyodysenteriae* has recently been incriminated. Infected animals lose appetite, develop diarrhea progressing to haemorrhagic scouring, and start to lose weight. Approximately a quarter to a third of infected animals die, and those which recover have suffered a severe check in growth and often remain unthrifty. Treatment of the disease condition with antibiotics, arsenicals or other chemotherapeutic agents is often useful, but increasingly, outbreaks are occurring which are not responsive to such treatment, and novel chemotherapeutic agents effective against swine dysentery are desirable.

Thus, according to the invention there is provided a veterinary method for the treatment or prophylaxis of swine dysentery which comprises administering to swine which are suffering from, or exposed to the risk of swine dysentery, an effective amount of quinoxaline 1,4-dioxide.

The quinoxaline 1,4-dioxide may be administered to the animals to be treated in admixture with a nutritionally balanced solid foodstuff, to give a supplemented foodstuff, it may be administered in a liquid, for example in drinking water or in skim milk, or, if an animal is so ill as to refuse to feed, it may be administered as a large, single oral dose sufficient to get the animal feeding again, whereafter the animal will normally accept the offered treated diet or water.

The supplemented nutritionally-balanced foodstuff should contain from 0.004% w./w. (40 g. per metric ton) to 0.025% w./w. (250 g. per metric ton) and preferably 50–100 g. per metric ton of quinoxaline 1,4-dioxide. Animals affected by swine dysentery may be fed on such a supplemented diet for a relatively short period, for example 7 to 30 days, until the symptoms of the disease disappear and growth rate returns to normal, for which purpose the diet should contain at lease 50 g. per ton of quinoxaline 1,4-dioxide; or prophylactically, animals may be fed on a supplemented diet continuously.

A supplemented foodstuff may be obtained by mixing quinoxaline 1,4-dioxide directly with the animal's normal ration, or it may be prepared by diluting a concentrated premix with the ration.

A suitable premix is, for example, a mixture of quinoxaline 1,4-dioxide with an inert edible carrier, for example kaolin, talc, calcium carbonate, fuller's earth, attapulgus clay, ground oyster shells, ground limestone, starch or lactose, or with a nutritionally-balanced edible carrier, for example a commercially available hog grower ration, or with some other conventional foodstuff, for example soya bean meal or toasted wheat meal.

Such a premix conveniently contains from 2% w./w. to 50% w./w. of quinoxaline 1,4-dioxide, so that a convenient quantity of premix may be diluted with a metric ton of a nutritionally-balanced foodstuff to produce a supplemented foodstuff containing from 40 g. per metric ton to 250 g. per metric ton of quinoxaline 1,4-dioxide. For example, 1.25 kg. of a 4% premix may be mixed with a metric ton of foodstuff to give a medicated foodstuff containing 50 g./ton of quinoxaline 1,4-dioxide.

The supplemented foodstuff and the premixes may also contain other compounds of known veterinary activity, for example an anthelmintic, for example tetramisole, pyrantel tartrate, thiabendazole, mebendazole, parbendazole or piperazine, a coccidiostat, for example methyl benzoquate, meticlorpindol, 3,5-dinitro-*o*-toluamide, 3,5-dinitrobenzamide, amprolium or decoquinate, or an antibiotic, for example zinc bacitracin, oleandomycin, virginiamycin, flavomycin, penicillin, tetracycline or tylosin, or a non-antibiotic antibacterial compound, for example arsenilic acid.

When quinoxaline 1,4-dioxide is to be administered to animals in drinking water, the solid material should be dissolved in water as required, at a rate of 0.001 to 0.1% w./w., preferably about 0.025% w./v. (about 70 mg. per gallon), and the treated water should be replaced at least every 12 hours, since quinoxaline 1,4-dioxide is not indefinitely stable in aqueous solution.

When quinoxaline 1,4-dioxide is to be administered as a single large oral dose to animals so ill as to refuse to feed, it may be administered in a conventional, veterinarily-acceptable form, for example in the form of a tablet, pill or concentrated solution or suspension. In most cases, a single oral dose of 50 mg./kg. body weight is ample to cure the animals sufficiently so that they will thereafter accept treated diet or drinking water.

The use of quinoxaline 1,4-dioxide in the treatment of swine dysentery presents little hazard to consumers of meat derived from pigs so treated, since residue studies show that the total tissue levels of quinoxaline 1,4-dioxide and all metabolites derived therefrom are acceptably low after about a month after cessation of treatment.

The use of quinoxaline 1,4-dioxide in the method of the invention is shown by the following examples:

EXAMPLE 1

(A) The effect of quinoxaline 1,4-dioxide against an established infection of swine dysentery was demonstrated as follows:

Eleven pigs (40–60 lbs. live weight) were starved for 24 hours, and were then infected by dosing orally with a 0.9% saline suspension of freshly collected gut contents and mucosal scrapings from the colons of pigs showing clinical symptoms of swine dysentery.

Five or six days later, 8 animals were showing marked dysentery symptoms with haemorrhagic scour. The infections were allowed to develop until day 8 post-infection, by which time 2 animals were so ill they refused to feed. These 2 animals were dosed orally once with 50 mg./kg. of quinoxaline 1,4-dioxide. Within 24 hours, they had commenced to feed and were offered a diet containing 50 g./ton of quinoxaline 1,4-dioxide, and at the same time 2 further scouring, though feeding, pigs were placed on the treated diet, while the remaining 4 scouring animals were retained as untreated controls, being fed on a commercial pig fattening ration without quinoxaline 1,4-dioxide.

All 4 treated animals stopped scouring within 1–2 days and growth returned to normal, while the untreated control grew progressively worse, with 2 animals eventually dying.

(B) The effect of quinoxaline 1,4-dioxide against the early stages of swine dysentery infection was demonstrated as follows:

Eleven pigs were infected in the manner described above, and after 4 days, 6 animals were placed on a diet supplemented with 50 g./ton of quinoxaline 1,4-dioxide, while the remaining 5 animals were retained on untreated control diet. Four of the five control animals developed haemorrhagic scours, but none of the treated animals showed symptoms of swine dysentery.

(C) The ability of quinoxaline 1,4-dioxide to prevent swine dysentery infections was demonstated as follows:

Nine pigs were infected with swine dysentery as described above, and after 24 hours, four animals were placed on a feed supplemented by 50 g./ton of quinoxaline 1,4-dioxide, while the remaining 5 animals were kept as untreated controls. All control animals developed symptoms of swine dysentery, but all the treated group remained perfectly healthy for at least the next month.

The results of these experiments are summarized as follows:

| Experiment | Duration of infection before start of treatment | No. of pigs | No. of pigs showing symptoms |
|---|---|---|---|
| A | 7 days | Treated, 5 [1] | 0 |
|   |        | Control, 5    | 4 |
| B | 4 days | Treated, 6    | 0 |
|   |        | Control, 5    | 4 |
| C | 1 day  | Treated, 4    | 0 |
|   |        | Control, 5    | 5 |

[1] 2 animals dosed orally with 50 mg./kg. of quinoxaline 1,4-dioxide. All other treated animals fed diet containing 50 g./ton quinoxaline 1,4-dioxide.

EXAMPLE 2

Twenty four individually penned pigs were fed for one week on a commercial pig fattening ration, before being treated orally with 70 mls. of a freshly prepared 0.9% saline suspension of infective material described in Example 1, on three successive days. When clinical symptoms of the disease developed in each animal, 17 were treated by feeding to them *ad libitum* a standard pig fattening ration containing 50 g./ton of quinoxaline 1,4-dioxide, and 7 were left as untreated controls and were fed the standard ration. After 28 days, the treated animals were returned to non-medicated standard ration for the remainder of the growing period up to 140 lbs. live weight.

Four of the 17 animals treated were so badly affected that they would not feed until they had been given a single oral dose of 50 mg./kg. body weight of quinoxaline 1,4-dioxide in water suspension.

The following results were obtained:

| Number of pigs | Mean daily live weight gain (lbs.) during— | | | Mean food conversion ratio (lbs. feed/lb. gain) during— | | |
|---|---|---|---|---|---|---|
| | Incubation period | 28 days after onset of symptoms | Total fattening period | Incubation period | 28 days after onset of symptoms | Total fattening period |
| Treated, 17 | 0.465 | 0.98 | 1.03 | 9.74 | 4.85 | 4.1 |
| Untreated, 7 | 0.693 | −0.23 | 0.40 | 4.75 | ([1]) | [2] 9.2 |

[1] Animals lost weight.
[2] Mean of 4 animals because 2 lost weight and 1 died of swine dysentery.

EXAMPLE 3

Sixteen individual penned pigs were fed for one week on a commercial pig fattening ration before being experimentally infected once as described in Example 2. Immediately after infection, all pigs were allowed to feed *ad libitum*, 8 on the commercial ration and 8 on the commercial ration supplemented with 50 g./ton of quinoxaline 1,4-dioxide, until slaughter at 120–140 lbs. live weight at 5 to 6 weeks. The following results were obtained:

| | No. showing swine dysentery symptoms | Mean daily live weight gain (lbs.) | Mean food conversion ratio (lbs. feed/lb. gain) |
|---|---|---|---|
| No. of pigs: | | | |
| Treated, 8 | [1] 1 | 1.53 | 3.95 |
| Untreated, 8 | 8 | 1.01 | 4.73 |
| Standard error | | 0.10 | 0.23 |

[1] One animal showed transient symptoms on days 32–34 post infection.

The difference in live weight gain between treated and untreated groups is significant at the 5% level ($p<0.05$), as is also the difference between the food conversion ratios of the two groups.

What we claim is:

1. A veterinary method for the treatment of swine dysentery which comprises administering to swine which are suffering from swine dysentery, an effective amount of quinoxaline 1,4-dioxide.

2. The method of claim 1 which comprises feeding to the swine a supplemented nutritionally-balanced foodstuff containing from 0.004% w./w. to 0.025% w./w. of quinoxaline 1,4-dioxide.

3. The method of claim 1 which comprises administering quinoxaline 1,4-dioxide to the swine in drinking water at a concentration of 0.001 to 0.1% w./v.

4. The method of claim 1 which comprises the administration to swine a single oral dose of 50 mg./kg. body weight, in a veterinarily-acceptable form.

References Cited

Imperial Chem. Ind., Chem. Abst., vol. 75 (1971), p. 34267f.

Padeiskaya et al.: Chem. Abst. vol. 68 (1968), p. 11327s.

SAM ROSEN, Primary Examiner